United States Patent [19]

MacCanna

[11] Patent Number: 4,545,186
[45] Date of Patent: Oct. 8, 1985

[54] METHOD AND APPARATUS FOR HARVESTING MUSHROOMS AND THE LIKE

[75] Inventor: Cathal MacCanna, Dublin, Ireland

[73] Assignee: Garran Enterprises Limited, Dublin, Ireland

[21] Appl. No.: 515,764

[22] Filed: Jul. 21, 1983

[30] Foreign Application Priority Data

Jul. 22, 1982 [IE] Ireland .................................. 1759/82

[51] Int. Cl.⁴ ............................................ A01D 45/00
[52] U.S. Cl. .................................... 56/327 R; 56/13.1
[58] Field of Search ...................... 56/12.9, 13.1, 13.2, 56/327 R, 328 R, 237, 233, 238; 47/1.1

[56] References Cited

U.S. PATENT DOCUMENTS

| | | | |
|---|---|---|---|
| 812,865 | 2/1906 | Nisbet | 56/13.2 |
| 1,388,106 | 8/1921 | Emerson | 56/339 |
| 2,179,031 | 11/1939 | Bustettier et al. | 56/336 |
| 2,629,218 | 2/1953 | Smith | 56/129 |
| 2,688,835 | 9/1954 | Rawson | 56/13.1 |
| 2,775,088 | 12/1956 | Bullock | 56/332 |
| 3,389,542 | 6/1968 | Rasmussen | 56/331 |
| 3,460,327 | 8/1969 | Johnson et al. | 56/328 R |
| 3,496,709 | 2/1970 | Egbert et al. | 56/237 |
| 3,624,990 | 12/1971 | Sinden et al. | 56/327 R |
| 3,635,005 | 1/1972 | Persson | 56/327 R |
| 3,731,476 | 5/1973 | Burgess | 56/237 |
| 3,855,760 | 12/1974 | Smith, Jr. et al. | 56/13.2 |
| 3,898,736 | 8/1975 | Landahl | 56/394 |
| 4,388,298 | 6/1983 | Gerber | 56/328 R |
| 4,472,929 | 9/1984 | MacCanna | 56/327 R |

FOREIGN PATENT DOCUMENTS

| | | |
|---|---|---|
| 2408997 | 6/1979 | France . |
| 6814542 | 4/1970 | Netherlands . |
| 7711510 | 4/1979 | Netherlands . |
| 7904028 | 11/1980 | Netherlands .................... 56/327 R |
| WO8001680 | 11/1980 | PCT Int'L Appl. . |
| 309106 | 10/1952 | Switzerland . |
| 2011773 | 9/1979 | United Kingdom . |

Primary Examiner—Paul J. Hirsch
Attorney, Agent, or Firm—Wegner & Bretschneider

[57] ABSTRACT

The invention is concerned with apparatus for harvesting mushrooms and the like. The apparatus comprises cutting means such as a knife which may be moved over a mushroom bed to sever mushrooms in the bed and lifting means for removing the severed mushrooms from the bed and transferring them to collecting means. The lifting means comprises an air mover. The air mover is comprised of a cylindrical chamber or bore having an inlet disposed above the cutting means and an outlet communicating with the collecting means. Compressed air is directed into the chamber through an annular orifice which is so profiled to cause the air stream to flow towards the outlet. A zone of low pressure is created adjacent the chamber inlet which draws ambient air into the chamber. The cut mushrooms are lifted into the chamber, are entrained in the stream of air passing through the chamber, and are delivered onto the collecting means which preferably is a conveyor. In a preferred embodiment, the knife and lifting means are mounted on the end of an elongate conveyor frame which is movable horizontally and vertically about a support column so as to impart maximum manouverability to the cutting knife and lifting means.

8 Claims, 7 Drawing Figures

METHOD AND APPARATUS FOR HARVESTING MUSHROOMS AND THE LIKE

BACKGROUND OF THE INVENTION

The invention relates to a method and apparatus for harvesting mushrooms and the like.

In order to obtain a high quality product it is necessary to harvest mushrooms as they mature. Mushrooms are grown commercially in an enclosed controlled environment, usually in longitudinal beds which contain the growing medium. The beds which may be in the form of boxes are disposed in tiers with passageways between the tiers. They may also be grown in other containers such as growing bags of plastics material. Mushrooms in a particular mushroom bed do not all grow at the same rate and so do not all mature at the same time. Therefore, it is necessary to selectively harvest those mushrooms which have reached the correct stage of growth and this may need to be done on a daily basis. Traditionally this selective harvesting has been done by hand with the result that quality mushroom growing is a labour-intensive industry. Indeed, labour and particularly harvesting labour comprises almost half of mushroom production costs. In some situations mushrooms are machine harvested. The known systems are extremely crude, however, and produce only third choice mushrooms for canning. The principle used is to run a transverse cutting blade over all of the beds after the mushrooms have been brought to an over-mature stage. Thus all the mushrooms will be harvested together irrespective of whether they are suitable for harvesting or not. One known apparatus for harvesting mushrooms in this way uses a rotating brush device disposed behind the transverse blade and which sweeps the cut mushrooms onto collecting means. The brush tends to damage the mushrooms but as these mushrooms are for use in canning, damage and bruising are of little consequence. It is also known to use vacuum devices to collect the cut mushrooms but such devices have not in general been satisfactory.

SUMMARY OF THE INVENTION

It is an object of the invention to provide an improved apparatus and method which may be used for the selective harvesting of mushrooms and the like.

According to the invention apparatus for harvesting mushrooms comprises cutting means adapted for movement over a mushroom bed to sever the mushrooms and lifting means for removing the severed mushrooms from the bed and transferring them to collecting means, wherein the lifting means comprises a housing defining an annular chamber, an inlet to the chamber adapted to receive the cut mushrooms and an outlet from the chamber communicating with the collecting means, and means for supplying a flow of air at high velocity into the chamber through an annular orifice in the wall of the chamber, the orifice being so profiled as to direct the supplied air to flow towards the outlet of the chamber whereby a zone of low pressure is created adjacent to the chamber inlet to induce a flow of ambient air into the inlet which together with the supplied air forms a stream of air flowing through the chamber whereby the cut mushrooms are lifted into the chamber inlet and conveyed through the chamber to the outlet.

Preferably, the cutting means comprises a knife having a cutting blade disposed below the chamber inlet of the lifting means, the knife and lifting means being manouverable laterally and longitudinally of the mushroom bed to selectively harvest mushrooms of desired maturity from the bed. Suitably, the knife is of such a length as to extend across the chamber inlet. The collecting means may comprise a conveyor belt or, alternatively, the mushroom may be delivered directly to container means.

In a preferred embodiment, the apparatus comprises an elongate frame which supports an endless conveyor belt movable along the frame, a knife mounted at one end of the frame, lifting means disposed above the knife, the lifting means comprising a housing defining an annular chamber, an inlet to the chamber disposed above the cutting blade of the knife and adapted to receive mushrooms cut by the knife, and an outlet from the chamber communicating with said conveyor belt, and means for supplying a flow of air at high velocity into the chamber through an annular orifice in the wall of the chamber, the orifice being so profiled as to direct the supplied air to flow towards the outlet of the chamber whereby a zone of low pressure is created adjacent to the chamber inlet to induce a flow of ambient air into the inlet which together with the supplied air forms a stream of air flowing through the chamber whereby the cut mushrooms are lifted into the chamber inlet and are conveyed by the air stream through the chamber to the chamber outlet and onto the conveyor.

Preferably, the knife is moved in a linearly reciprocating manner. In yet a further embodiment the cutting means comprises a knife or cutting wire extending laterally across the full width of the mushroom bed and movable longitudinally of the bed.

BRIEF DESCRIPTION OF THE INVENTION

Some embodiments of the invention are hereinafter described with reference to the accompanying drawings, wherein.

DETAILED DESCRIPTION OF THE INVENTION

Referring to FIGS. 1 to 5 of the drawings, one embodiment of apparatus according to the invention comprises cutting means generally designated as 1, lifting means generally designated as 2 and collecting means generally designated as 3.

The cutting means 1 and lifting means 2 are mounted at one end of an elongate frame 4 comprised of two parallel spaced apart side frame members 5, 6. As more clearly shown in FIG. 2, the side frame members 5, 6 are connected by roller bars 7 which also act as guides for an endless conveyor belt 8 which travels the full length of the elongate frame 4. The conveyor belt 8 is powered by an electric motor 9 mounted at the end of the frame 4 remote from the cutting means 1 and lifting means 2, and which rotates a suitable drive pulley (not shown) for the conveyor belt in well known manner. At the end of the frame 4 adjacent the lifting means 2, the conveyor belt 8 is turned about a tensioning pulley 10 (see FIG. 3), the tension of which may be adjusted by a screw arrangement 11 in well known manner.

The horizontal elongate frame 4 is supported by a box frame 12 (see FIG. 2), which is comprised of two spaced-apart side walls 13, 14. Each side wall supports two pairs of rollers 15 which engage with the upper and lower edges of the side frame members 5, 6. This arrangement permits the elongate frame 4 to slide in a horizontal plane, forwardly and rearwardly relative to the box frame 12. The box frame 12 is connected to a support plate 16 through an arcuate compression spring contained in casing 17. The compression spring permits a restricted angular movement of the elongate frame 4 in the vertical plane. The tension in the compression spring, and hence the degree of angular movement of the elongate frame 4, is controlled by a nut 18. The support plate 16 is welded to, or integral with, an annular bush 19. The bush 19 is slideable vertically on a tubular support column 20. The bush 19 is also rotatable around the support column 20 so that the elongate frame 4 can swing through 360° around the column. The bush 19 can be locked at any desired position on the support column by means of a locking arm 21. The support column 20 is carried on a mobile platform 24. A handle 22 (see FIG. 1) is provided at the end of the elongate frame 4 by means of which an operator can guide and adjust the position of the elongate frame 4. The box frame 12 is provided with carrying handles 23.

Figure 1:
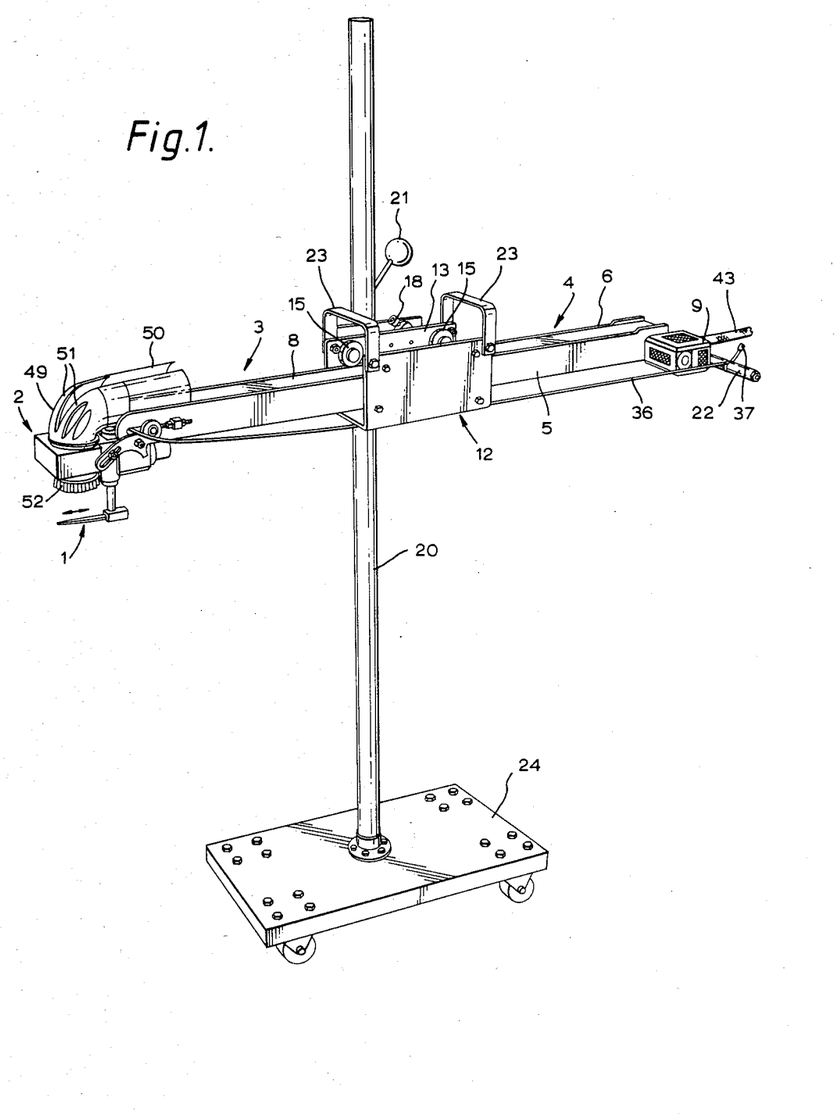
FIG. 1 is a perspective view of one embodiment of apparatus according to the invention.
Figure 2:
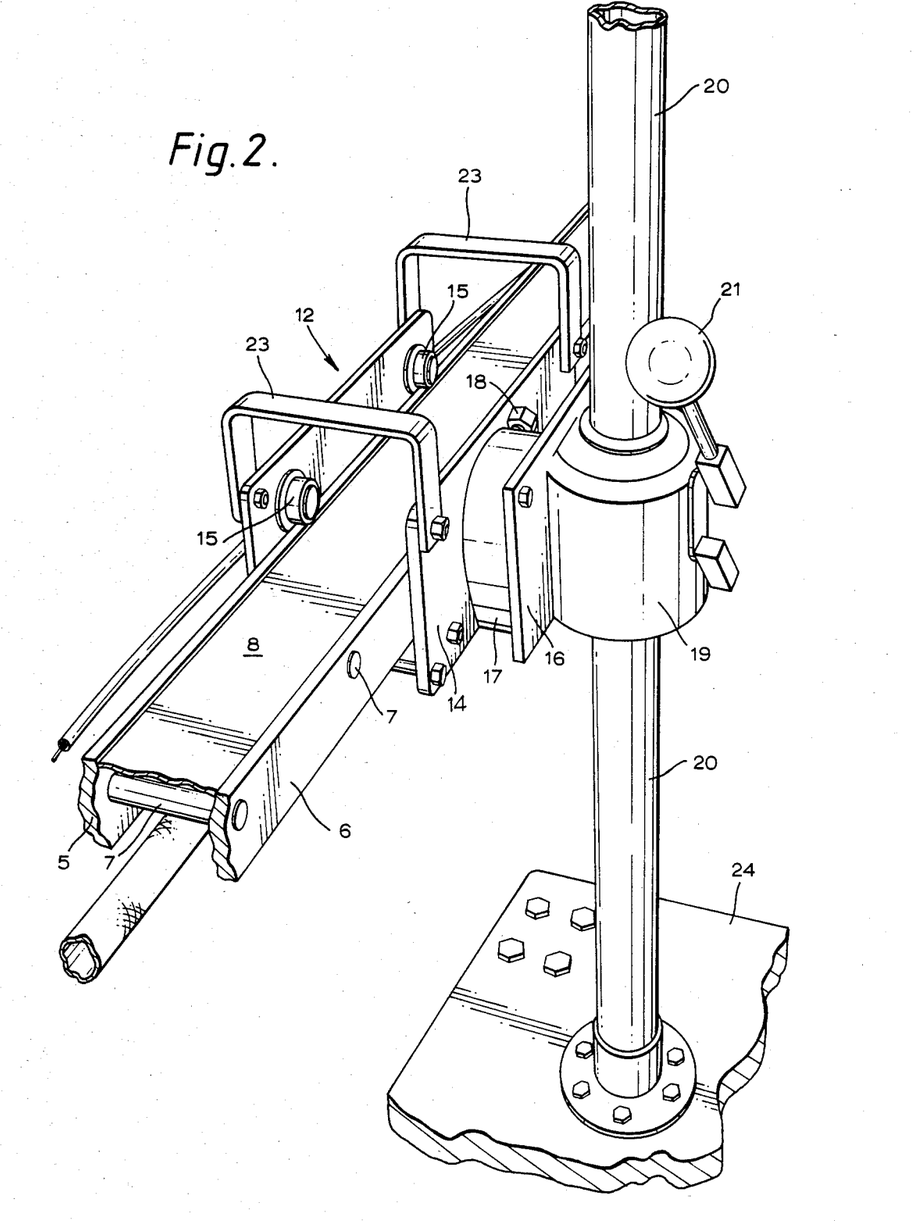
FIG. 2 is a perspective view, to an enlarged scale, of part of the apparatus of FIG. 1.
Figures 3, 4:
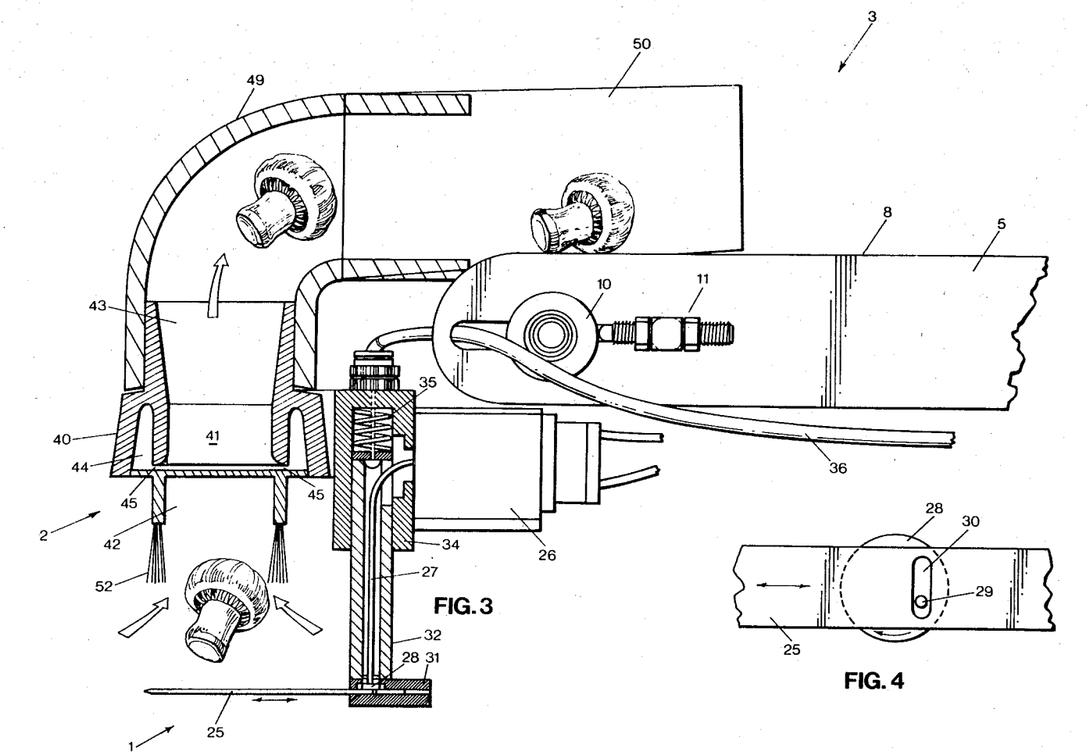
FIG. 3 is an enlarged side elevation, partly in cross-section, of a detail of the apparatus of FIG. 1, some parts being omitted for the sake of clarity.
FIG. 4 is an enlarged plan view of a detail of the drive arrangement for the cutting knife shown in FIG. 3.

The cutting knife arrangement 1 is shown more clearly in FIGS. 3 and 4. The cutting knife comprises a short cutting blade 25 which suitably is from 1 to 3 inches (approx. 2.5 to 8.0 cm) in length. Preferably, both edges of the knife are sharpened to provide cutting edges, and the edges may be serrated if desired. Preferably, the knife is moved in a linearly reciprocating manner in the direction shown by the arrows in FIGS. 3 and 4. It would also be possible to use two or more knives operating, for example, in an overlapping reciprocating manner or in a scissors-like fashion, or to use a rotating disc blade. In the arrangement shown in FIGS. 3 and 4 the linearly reciprocating knife is driven by an electric motor 26 or by an air-motor. The drive output from the motor is transmitted through a flexible drive cable 27 to a circular rotating cam plate 28. As more clearly shown in FIG. 4, the cam plate 28 is formed with an eccentric spigot 29 which engages in a slot 30 in the blade 25. The blade is thus caused to slide in a reciprocating manner in a guide bearing 31. The cam plate 28 is mounted for rotation in the lower end of a tubular shaft 32. The shaft 32 is movable within a sleeve 34 against the action of a compression spring 35. A Bowden cable 36 connects the top of the shaft 32 to a control lever 37 on the handle 22 (see FIG. 1). By means of this control lever the operator can adjust the position of the knife blade vertically relative to the lifting means 2 thus allowing mushrooms of different sizes to be harvested.

Figure 5:
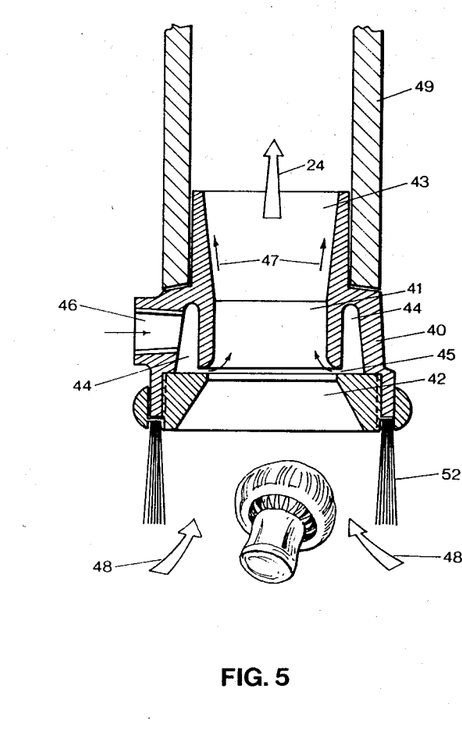
FIG. 5 is a front sectional elevation of the lifting means of FIG. 2 in a slightly modified form.

The lifting means 2 is best shown in FIGS. 3 and 5. FIG. 5 is a front elevation of the lifting means of FIG. 3, but the shape and interior profile is shown in a somewhat modified form although it operates in exactly the same way as the form shown in FIG. 3. The lifting means comprises a housing 40 which defines a substantially cylindrical chamber 41. The chamber has an inlet 42 and an outlet 43. The walls of the chamber 41 are substantially parallel, but those of the outlet 43 may diverge outwards. In the arrangement shown in FIG. 3 the walls of the chamber inlet 42 are substantially parallel but as shown in FIG. 5 these may be inclined inwardly if desired. The chamber 41 is surrounded by an annular passageway 44 which communicates with the exterior of the chamber 41 through an annular orifice or gap 45. The passageway 44 is provided with a compressed air inlet 46 (see FIG. 5).

The inlet 42 is disposed above the blade 25 of the cutting knife and suitably the blade 25 extends across the full width of the inlet 42. The diameter of the inlet 42 may vary. In the arrangement shown it has a diameter of approximately 6.5 cm while the knife blade 25 may measure approximately 8 cm.

In use, compressed air is fed through a flexible hose 43 (see FIGS. 1 and 2) to the inlet 46 and into the annular passageway 44. As shown by arrows in FIG. 5, the compressed air passes through the annular orifice or gap 45, where it is throttled, and into the chamber 41. The stream of compressed air enters the chamber 41 as a thin layer. The exit walls of the annular orifice 45 are of curved profile to cause this layer of air, which is flowing at high velocity, to turn through approximately 90° to pass through the chamber 41 and the outlet 43 in a direction substantially parallel to the axis thereof as indicated by the arrows 47. The action of the high velocity air stream flowing over the wall profile of the device causes a pressure drop in the inlet zone which induces ambient air to flow into the inlet 42 as indicated by the arrows 48. The zone of low pressure and/or the resultant flow of ambient air into the inlet 42 causes any cut mushrooms in the vicinity of the inlet 42 to be lifted into the inlet and conveyed by the stream of air through the chamber 41 to the exit 43.

The lifting means as described above is known as an "airmover" and is commercially available from HMC-Brauer Limited, of Milton Keynes, Bucks, England. Air movers have been used to generate streams of air for cooling in a number of applications and for removing smoke, fumes and dust from a particular environment. However, they have not previously been known for use in lifting or conveying mushrooms or the like.

An annular cowl 49 is fitted around the chamber exit 43 and directs the stream of air leaving the exit, and the mushrooms entrained therein, onto the leading edge of the conveyor belt 8. The cowl 49 is provided with extension walls 50 which aid in guiding the mushrooms onto the conveyor 8. The cowl 49 has a plurality of apertures 51 in the outer wall thereof. Part of the air stream leaving the chamber exit 43 can dissipate through these apertures which aids in decelerating the mushrooms as they leave the exit 43. Further, pieces of growing medium or other unwanted particles entrained in the air stream tend to be dissipated through the apertures 51. The inlet 42 to the chamber is provided, around the periphery thereof, with a skirt 52 which may be comprised of bristles, short lengths of plastics material, or other suitable material. The purpose of the skirt 52 is to permit the airmover to pass over larger mushrooms without knocking-over or damaging such mushrooms.

Figure 6:
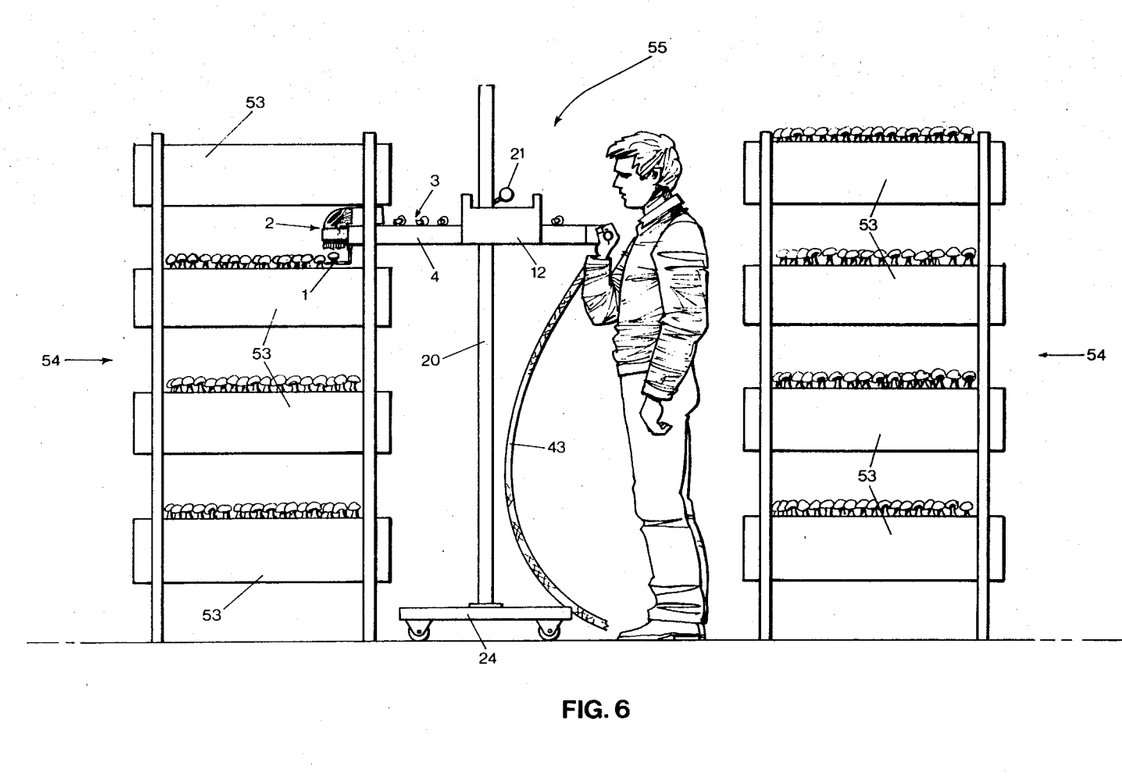
FIG. 6 is an elevation showing the apparatus of FIG. 1 in use.

The mushroom harvesting apparatus of FIGS. 1 to 5 of the drawings is shown in use in FIG. 6. FIG. 6 illustrates the growing of mushrooms in longitudinal beds 53 which are disposed one above the other to form tiers 54. In the arrangement shown in the drawings there are four beds in each tier but it will be appreciated that the number may vary. The tiers 54 are spaced apart to form passageways 55. The passageways are sufficiently wide to enable an operator to move the harvesting apparatus by means of the mobile platform 24 along the passageway. The operator may adjust the elongate frame 4 vertically, upwardly and downwardly on the support column 20 so that the cutting knife 1 can be moved into the particular mushroom bed which it is desired to harvest. The operator can manoeuvre the cutting knife so as to selectively harvest only those individual mushrooms or clumps of mushrooms which are at the right stage of maturity for harvesting. The fact that the elongate frame 4 can swing 360° about the column 20 enables the operator to cut a large swath of mushrooms without the need to move the mobile platform 24. As mentioned above the elongate frame is movable in a horizontal plane, backwards and forwards, on roller bearings. This enables the operator to penetrate transversely across the width of the mushroom bed 53. The limited pivotal movement of the elongate frame 4 about the plate 16 (see FIG. 2) enables the operator to adjust the height of the cutting knife 1 above the surface of the mushroom bed so that he can cut mushrooms of different heights. Alternatively, the column 20 can be provided with a vertical rack which engages with a pinion on the elongate frame 4 to permit fine vertical adjustment of the frame 4 and the cutting knife relative to the horizontal surface of the mushroom bed. The height of the blade 1 relative to the air mover 2 may be adjusted by means of the control 37. The mushrooms selected and cut by the operator are lifted by the air mover 2 and directed onto the moving conveyor belt 8. The conveyor belt 8 may direct the cut mushrooms to market containers (not shown) which can be mounted on the mobile platform 24. Alternatively, the mushrooms may be conveyed onto an additional conveyor system which conveys the mushrooms to a central packing location. It will thus be appreciated that the apparatus of the invention enables mushrooms to be harvested at the appropriate stage of maturity, with a quality which is at least as good as that obtained by hand-picking. However, the rate of harvesting is considerably faster than that achieved by hand-harvesting and so significantly reduces the cost of labour. The apparatus is sufficiently flexible to be used to harvest mushrooms in other growing systems such as growing bags.

Figure 7:
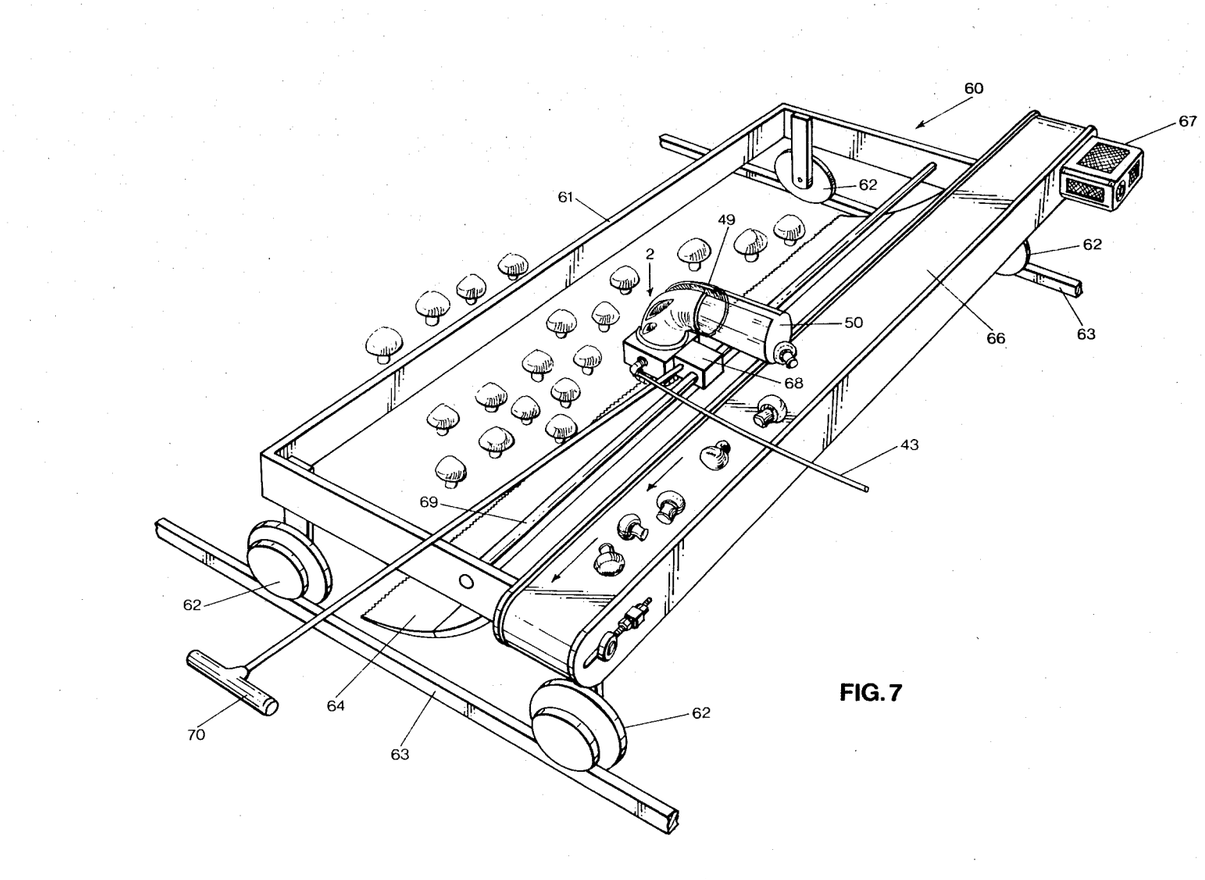
FIG. 7 is a perspective view of a second embodiment of apparatus according to the invention.

The apparatus described with reference to FIGS. 1 to 6 is particularly suitable for use in the selective harvesting of mushrooms. However, the apparatus of the invention also may be used with known cutting machines which use a transverse blade or cutting wire which extends across the cutting bed and is moved longitudinally of the bed. One embodiment of such apparatus is illustrated in FIG. 7 of the accompanying drawings. Referring to FIG. 7, the apparatus comprises a mobile carriage 60 having a rectangular frame 61 mounted on four wheels 62. The carriage 40 is adapted to straddle a mushroom bed with the wheels 62 running on spaced-apart-rails 63 which extend longitudinally on each side of the bed. The wheels 62 may be fitted with flanges to guide them on the rails. A knife 64 is mounted below the frame 41 and the blade of the knife extends transversely across the whole width of the bed. The knife 64 may have a fixed blade, a reciprocating blade or a vibrating blade. Alternatively, a cutting wire may be used. The cutting edge of the blade is spaced a short distance above the surface of the bed such that it will come into contact with the stem portions of the mushrooms in the bed as the carriage moves along the bed. Means (not shown) may be provided to adjust the height of the knife 64 relative to the bed.

An air mover 2 is mounted directly above the cutting edge of the blade. The air mover 2 is constructed and operates as described above in relation to FIGS. 1 to 6, and like reference numerals denote like parts. The cut mushrooms are lifted by the air mover 2 and are conveyed through the air mover onto a transverse conveyor 66 powered by an electric motor 67. The conveyor 66 conveys the cut mushrooms to suitable receptacles (not shown) or to other conveying means located at the side of the bed.

The air mover 2 is mounted on a block 68 which is slidable along a transverse rail 69. The air mover 2 may be moved manually across the mushroom bed by means of a handle 70 so as to pick up the mushrooms as they are cut by the blade 64. Alternatively, the air mover 2 may be motorised to move in a reciprocal travel across the bed in synchronism with the forward movement of the carriage 61. The speed of travel of the carriage 61 and the air mover 2 are so chosen that all of the cut mushrooms are picked up by the air mover 2. In yet a further alternative arrangement, a plurality of air movers 2 are mounted above the blade 64 in spaced relationship such that all of the mushrooms cut by the blade are picked up by the air movers without any transverse movement of the air movers.

What is claimed is:

1. Apparatus for selective harvesting of mushrooms from a mushroom bed, comprising support means, an elongate frame mounted to said support means and movable vertically and horizontally with respect to said support means and supporting an endless conveyor belt movable along the frame, a knife mounted to the frame, adjustable vertically and movable laterally and longitudinally with respect to the mushroom bed, lifting means disposed above the knife, the lifting means comprising a housing defining an annular chamber, an inlet to the chamber disposed above the cutting blade of the knife and adapted to receive mushrooms cut by the knife, and an outlet from the chamber communicating with said conveyor belt, and means for supplying a flow of air at high velocity into the chamber through an annular orifice in the wall of the chamber, the orifice being so profiled as to direct the supplied air to flow towards the outlet of the chamber whereby a zone of low pressure is created adjacent to the chamber inlet to induce a flow of ambient air into the inlet which together with the supplied air forms a stream of air flowing through the chamber whereby the cut mushrooms are lifted into the chamber inlet and are conveyed by the air stream through the chamber to the chamber outlet and onto the conveyor.

2. Apparatus as claimed in claim 1 wherein the elongate frame is mounted on a substantially vertical support column, is rotatable in a substantially horizontal plane around said column, is adjustably movable vertically of said column, and is movable in a horizontal plane forwardly and rearwardly relative to the column, whereby an operator may manouver the cutting knife and lifting means over a mushroom bed so as to selectively cut and collect mushrooms of a desired maturity.

3. Apparatus as claimed in claim 1 wherein means are provided to move the cutting knife substantially vertically relative to the chamber inlet of the lifting means.

4. Apparatus as claimed in claim 1 wherein the outlet from the chamber is provided with an annular cowl which is adapted to direct mushrooms leaving the chamber outlet onto said conveyor belt.

5. Apparatus according to claim 4 wherein the cowl has a plurality of apertures in the wall thereof through which part of the air stream leaving the chamber outlet is dissipated.

6. Apparatus for the selective harvesting of mushrooms from a mushroom bed, comprising:
 a support means;
 a frame mounted to said support means, movable vertically and horizontally with respect to said support means;
 cutting means secured to the frame, adjustable vertically and movable laterally and longitudinally with respect to the mushroom bed, comprising a reciprocating cutting blade for selective cutting of mushrooms of desired maturity;
 lifting means secured to the frame, having a mushroom-accepting inlet substantially directly above said cutting means, for lifting mushrooms cut by said cutting means, comprising a housing defining an annular chamber in fluid communication with said inlet, an outlet in fluid communication with said annular chamber, orifice means in the housing for allowing air to enter said annular chamber, means for supplying a first flow of air through the orifice means and into the annular chamber at high velocity, said orifice means directing the flow of air toward said outlet to produce a zone of low pressure adjacent said inlet to induce a second flow of ambient air into said inlet which together with said first flow of air forms a stream of air flowing through the annular chamber whereby cut mushrooms are lifted into the inlet and conveyed through the annular chamber to the outlet; and
 collecting means for accepting mushrooms from said outlet.

7. Apparatus according to claim 6, wherein the collecting means comprises a conveyor belt.

8. A method of harvesting mushrooms comprising moving a cutting knife over a mushroom bed to selectively harvest mushrooms of desired maturity from the bed, applying lifting means to said cut mushrooms, said lifting means being substantially directly above said cutting knife and comprising a housing defining an annular chamber, an inlet to the chamber adapted to receive the cut mushrooms and an outlet from the chamber communicating with collecting means for the mushrooms, supplying a flow of air at high velocity into the chamber through an annular orifice in the wall of the chamber, which orifice is of a profile to cause said supply of air to flow towards the chamber outlet in a direction substantially parallel to the axis of the chamber whereby a zone of low pressure is created adjacent to the chamber inlet which induces a flow of ambient air into the inlet, and which together with the supplied air forms a stream of air flowing through the chamber, and whereby the cut mushrooms are thereby lifted into the chamber inlet and are conveyed through the chamber to the outlet where they are delivered to the collecting means, said cutting knife and lifting means being mounted to a frame means, which is mounted to a support means, said frame means being movable vertically and horizontally with respect to said support means.

* * * * *